United States Patent
Martin, Jr.

[15] 3,659,453
[45] May 2, 1972

[54] FLUID SYSTEM LEAK DETECTOR

[72] Inventor: Dougall C. Martin, Jr., 313 Eller Avenue, Englewood, Ohio 45322

[22] Filed: June 26, 1970

[21] Appl. No.: 50,111

[52] U.S. Cl. ............................................................73/40
[51] Int. Cl. ..................................G01m 3/06, G01m 3/26
[58] Field of Search ....................................73/40, 37

[56] References Cited

UNITED STATES PATENTS

| | | | |
|---|---|---|---|
| 1,732,035 | 10/1929 | White | 73/40 X |
| 2,655,893 | 10/1953 | Cox et al. | 73/40 X |
| 2,423,902 | 7/1922 | Kramer | 73/40 |
| 2,936,610 | 5/1960 | Schiedel | 73/40 |

Primary Examiner—Louis R. Prince
Assistant Examiner—William A. Henry, II
Attorney—Norman R. Wissinger

[57] ABSTRACT

A fluid system leak detector comprising concentric inner and outer annular liquid chambers joined by an interconnecting conduit, the outer chamber being communicable with the fluid system to be checked and the inner chamber being in vented communication with an overlying test pressure chamber, a transparent tube horizontally disposed within said outer chamber and in fluid transmitting communication with the opening of said interconnecting conduit into said outer chamber and a liquid confined within said annular chambers movable in response to a pressure differential between the fluid system and the test pressure chamber wherein the quantity of the liquid is such that, when it is in either of said annular chambers it will not fill the same, either to the point of communication with the fluid system in the case of the outer chamber or to the vent to the test pressure chamber in the case of the inner chamber. Upon association of the detector with a fluid system having a pressure differential from ambient pressure the liquid will move from one annular chamber to the other and the transfer of all of the liquid to the chamber toward which it so moves is completed by temporarily opening the valve connecting the test pressure chamber with the atmosphere. Upon the closing of this valve, any loss of pressure in the fluid system will create a pressure differential between it and the test pressure chamber in response to which the liquid will move in the direction of the lower pressure indicating a leak in four distinct phases; viz., movement of the liquid through the horizontally disposed tube, a rising of the liquid in the annular chamber in the direction of the lower pressure, a further reading of the last of the liquid passing through the horizontally disposed tube, and finally bubbling of gas through the liquid after it is entirely transferred to the annular chamber in the direction of the lower pressure.

6 Claims, 10 Drawing Figures

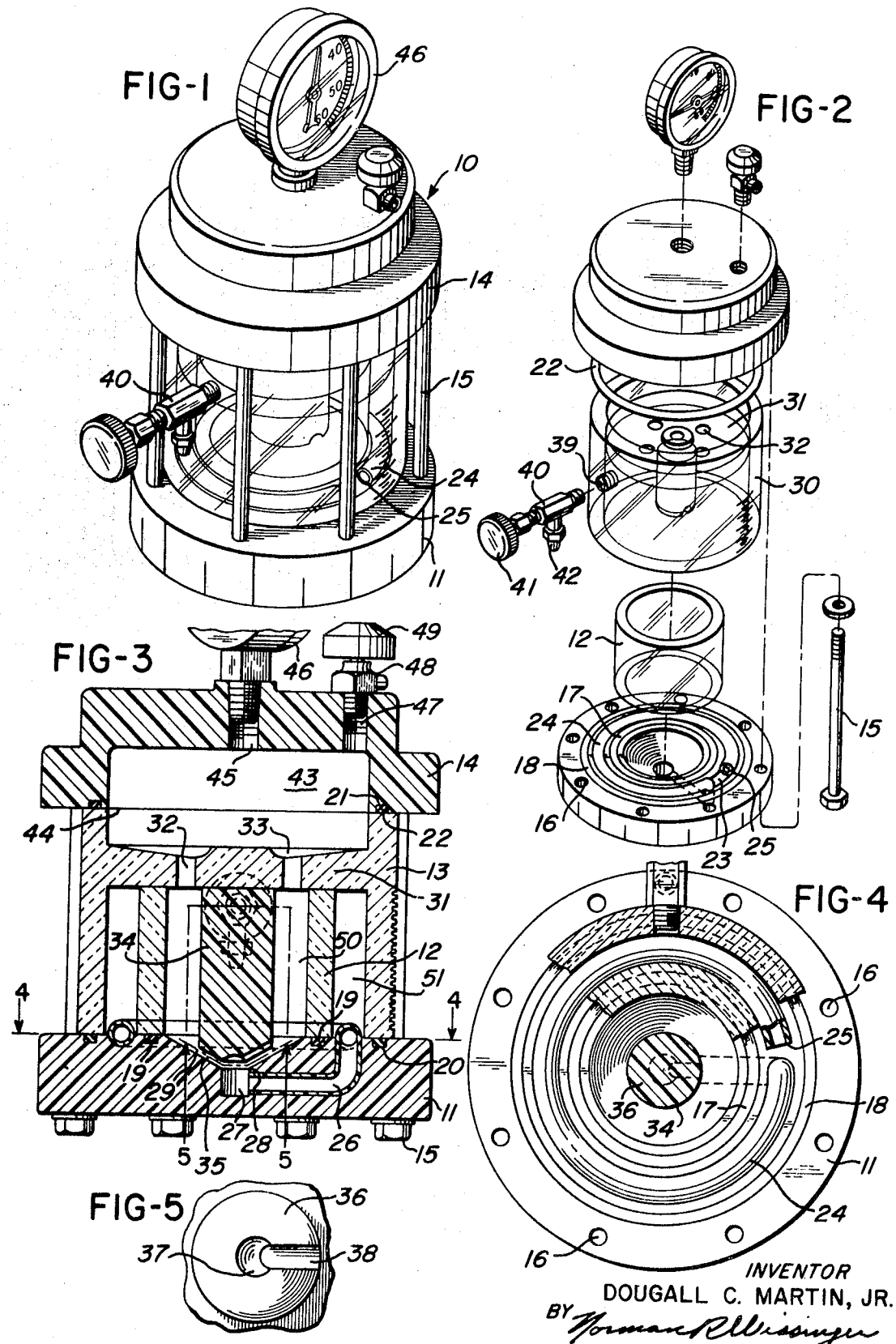

FLUID SYSTEM LEAK DETECTOR

BACKGROUND OF THE INVENTION

1. Field of the Invention

The present invention pertains to the art of fluid pressure sensing devices, particularly of the type adapted to detect and to give visible evidence of a change in fluid pressure such as occurs in the case of a leak in a pressurized fluid system.

2. Description of the Prior Art

In the case of all pressurized fluid systems, and particularly in the case of systems employing corrosive, poisonous or otherwise dangerous or damaging fluids, it is important that the system components be constructed, assembled and maintained in fluid-tight, leak-free condition. It is required therefore, at least upon the construction of such systems and usually periodically thereafter, that they be checked for leaks and, in almost all cases, it is extremely important that even small or slow leaks be detected.

Because the leak detecting devices of the prior art have not been particularly sensitive, leak detection procedures have been quite complicated, from the standpoint of both the time and the apparatuses involved. Traditionally, leak detection systems have involved relatively insensitive pressure gauges which, because of their insensitivity have had to be associated with the system being tested for prolonged periods of time of on the order of twenty-four hours or more before a significant change could be noted. It has consequently been common practice to employ in combination with the pressure gauges a monitoring and recording apparatus such as a revolving graph upon which the slowly developing change resulting from the leak can be recorded for later inspection. Because of the necessary involvement of many complicated and delicate parts in such devices and because of the time during which they must all function properly, the test results have not always been considered reliable, especially since a variety of other conditions, such as changes in ambient pressure and temperature over the period of time involved, have been known on many occasions to give false indications of a leak when in fact none exists. In order to avoid some of these problems, the prior art has resorted to more delicate sensing devices such as liquid-filled U-tube manometers through which even a very small leak will give a relatively prompt indication of itself. These devices have however had limited utility in that it is difficult to determine the size or seriousness of a leak simply from the movement of the liquid or of the gas bubbling through the liquid. On the other hand, a large leak often results in a complete displacement of the liquid from the manometer usually drawing this liquid into fluid system being tested to its pollution and damage. These devices also have been prone to give false indications of a leak because of variations in temperature or pressure occurring within or surrounding the system during the course of the test. At the same time, all of such devices have been fragile and difficult to manipulate.

It is accordingly and object of the present invention to provide an improved fluid system leak detecting device capable of giving an immediate indication of the presence of even a very small leak.

Yet another object of the invention, is to provide such a leak detector which will indicate the magnitude of the particular leak, both almost immediately upon the application of the device to the system and also over such period of time as it may be desired to monitor the sealed condition of the system.

Still another object of the invention is to provide a leak detector in the form of a self-contained, compact unit which may be readily transported and easily associated with fluid systems to be tested.

Still another object of the invention is to provide a leak detector which will not give false indications of leakage in response to temperature, pressure and other changes either within or without the system not related to a leak therein.

Still another object of the invention is to provide a leak detector which can be left on a fluid system for a prolonged period of time without maintenance, observation or other manipulation but will continue to give visible evidence of any leak that may have occurred or be occurring over such prolonged period.

Yet another object of the invention is to provide a liquid-containing leak detector from which there is no danger that the liquid will enter and contaminate the fluid system being tested.

Other objects and advantages will appear from a reading of the following disclosure in connection with which reference may be had to the appended drawings.

DESCRIPTION OF THE DRAWINGS

FIG. 1 is a perspective view of a leak detector according to the present invention:

FIG. 2 is an exploded perspective view of the leak detector illustrated in FIG. 1.

FIG. 3 is an elevational view in cross-section of the leak detector illustrated in FIGS. 1 and 2.

FIG. 4 is a plan view in partial cross-section on the line 4 — 4 of FIG. 3.

FIG. 5 is an enlarged fragmentary plan view on the line 5 — 5 of FIG. 3.

Referring now to FIGS. 1 through 5, a leak detector according to the present invention, designated generally by the number 10 is shown to comprise a base member 11, an inner sleeve 12, an outer sleeve member 13 and a cap 14, held together in superimposed and concentrically aligned position by the end-threaded bolts 15 passing through openings 16 in the base and threadably engaging threaded openings in the cap 14. The base 11 is provided with inner and outer annular grooves 17 and 18 respectively in registry with the lower end surfaces of the inner sleeve 12 and the outer sleeve 13 to define in combination therewith passages in which circular gaskets or sealing members 19 and 20 of a deformable material may be positioned to effect a fluid-tight seal between the sleeve members and the base when the same are held together by the fasteners 15. Similarly, the cap 14, is provided with an annular groove 21 in registry with the upper surface of the outer sleeve member 13 to define in combination therewith a channel in which may be positioned the circular gasket 22 for fluid sealing contact between the cap and the sleeve component.

Figure 6:
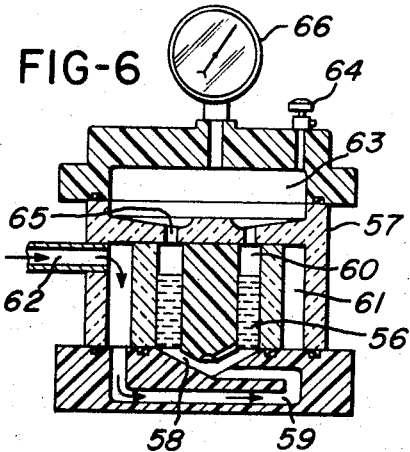
FIG. 6 is a cross sectioned elevational view of a leak detector according to the invention at the commencement of a test.

Referring again to the base 11, between the grooves 17 and 18 is an intermediate groove 23 opening upon the base surface to hold in nesting relationship the horizontally disposed hollow tube 24 having an open end 25. The opposite end of the tube is either positioned within or is at least in fluid-tight communication with a channel 26 connecting the groove 23 with the bore 27 which opens upon the upper surface of the base at the centrally disposed opening 28 at the bottom of a dished portion 29 at the center of the upper surface thereof.

In the embodiment shown, the inner sleeve member 12 may simply be a hollow cylindrical member open at both ends. The outer sleeve member 13 on the other hand, in addition to having the cylindrical outer shell or skirt 30, has a horizontally extending web component 31 through which are a plurality of vertically disposed bores 32. In one preferred example, the upper surface of the web portion 31 is itself characterized by a dished portion 33 so that the lowest point of this upper surface will be at the openings 32 to facilitate the drainage of any liquid above the web portion through the openings. Also associated with the outer sleeve member is the centrally located vertically extending solid cylindrical projection 34 which, as shown, may be formed intergrally with the outer sleeve member 13 or may be separately attached thereto in such a manner that, when the components are assembled in their superimposed relation, the lower surface of the center post 34 will be spaced from the dished upper surface 29 of the base 11 to provide a cone-shaped fluid passage 35. The surface 29 is sloped toward the opening 28 so that liquid will drain readily to the opening. As best shown in FIG. 5, the lower surface of the post 34 is composed of the upwardly inclined tapered surface 36 having a centrally disposed depression 37 intersected by the radially extending groove 38. The outer sleeve member 13 is further characterized by a threaded opening 39 therethrough into which may be threadably positioned a valve component 40 manually operable by turning the knob 41 selectively to open and to close the passage between the threaded opening 39 and the nipple 42 at which, by suitable pipes, tubings and other fittings, the device may be associated with a fluid system to be tested as hereinafter described.

The cap 14, like the base 11, is generally of a flat cylindrical shape, except that interiorly thereof is the hollow recessed portion 43 which, together with the web 31 of the sleeve member 13, when the components are held in their superimposed relationship forms a test pressure chamber 44. For measuring pressure in this chamber, the cap may be provided with a threaded opening 45 into which may be positioned a conventional pressure gage 46. The upper surface of the cap may also be provided with an additional threaded opening 47 in the form of a vent passage into which may be threadably inserted the valve 48 which, by manipulation of the knob 49, may selectively close the cap and the chamber 44 defined thereby or vent it to the atmosphere.

When the components as above described are assembled and held in their superimposed relationship, as can best be seen by reference to FIGS. 1 and 3, there is provided a compact unit having concentric inner and outer annular liquid chambers 50 and 51 respectively which are joined by the interconnecting conduit or passage 26,27 and 35 wherein the inner chamber 50 is in vented communication with the overlying test pressure chamber 44. At the bottom of and opening into the outer chamber 51 is positioned the horizontally disposed tube 24 in fluid transmitting communication with the inner chamber 50. It is to be understood that it is this establishment of the inner and outer annular chambers so interconnected by a conduit and so exposed to a test pressure chamber that is critical to the present invention and that the same may be provided by a variety of different assemblages of parts and components or may indeed may be a completely integral unit depending upon the materials and manufacturing processes employed. To facilitate the reading of the device, It is preferred that the horizontally disposed tube and the walls defining the inner and outer chambers 50 and 51 be composed of a transparent material such a polypropylene, polyethylene or cost acrylic resin. The entire device on the other hand may be made of such materials, the only additional requirements for which are those usually associated with pressure recepticels requiring sufficient rigidity, tensile strength and other physical properties to accommodate the same.

As illustrated in FIGS. 6 through 10, a liquid 56 is confined in the unit 57 and, by its passage through the interconnecting conduit comprising the conical trough 58 and the passage 59, is moveable in response to a pressure differential between the fluid system being tested and the test pressure chamber from the inner annular chamber 60 to the outer annular chamber 61 or vice versa. In connection with FIGS. 6 through 10, it will be observed that the interconnecting conduit between the respective chambers is, for the sake of clarity, shown as being contained within the base of the unit. In the preferred case as illustrated in FIGS. 1 through 5 however, and for ease of readability of the passage of fluid through the interconnecting conduit, at least a portion of the interconnecting passage is preferably positioned within the outer annular chamber and is visible therethrough. In all cases it is to be noted that the volume of the liquid within or moving between the said chambers is such, relative to the total volume of the respective chambers themselves that even when all of the liquid is in one or the other of them in response to certain test conditions to be hereinafter more fully described, the particular chamber will not be filled to the point at which the liquid is exposed to or might run or escape therefrom either into the system being tested or into the test chamber. In certain preferred cases it is desirable that the total volume of the inner and outer chambers be identical; and, to control this, the volume of the center post within the inner chamber 60 may be diminished or enlarged. While the liquid employed may be any of a number of liquids it is preferred for ease of readability that it be colored or opaque. It is also preferred for obvious reasons that the liquid be non-corrosive relative to the materials of which the walls of the chambers are composed and non-freezing and non-boiling within the range of such ambient temperatures as are expected to be encountered. Diluted ethylene glycol has been found suitable.

In the operation of the device, as for example in the testing of a fluid system having pressures normally greater than atmospheric pressure, the unit is first manipulated as illustrated in FIG. 6 so that all of the liquid 56 will be present in the inner chamber 60. To achieve this condition, the main fitting 62 may be connected to a source of air or other gas under sufficiently high pressure to overcome the pressure in the test chamber 63 to cause the desired flow. To facilitate the liquid movement of relief valve 64 may be opened thereby eliminating any back pressure from the test chamber 63. This same positioning of the liquid within the inner chamber 60 may be accomplished without the aid of extraneous pressure sources by simply connecting the fitting 62 with the fluid system to be tested, opening the vent valve 64 and allowing it to remain open until the pressure from within the system via the opening 62 has forced all of the liquid in to the inner chamber 60. Since the device under these circumstances is at this point already in fluid-tight communication with the system, it is necessary only to close the relief valve 64 to bring the unit in condition for immediate testing of the system.

Figure 7:
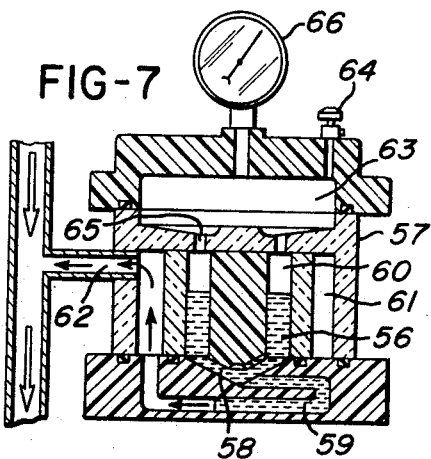
FIG. 7 is a cross-sectioned elevational view of the same leak detector affixed to a fluid system at the very earliest stage of detecting a leak in the system.
Figure 8:
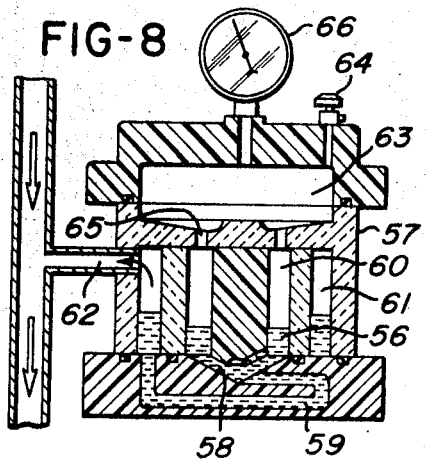
FIG. 8 is a cross-sectioned elevational view of the same leak detector at an intermediate stage of the test.

As illustrated in FIG. 7, once the device is in association with a pressurized fluid system, any infinitesimal leak therein will result in a pressure reduction which will in turn cause a flow of the gas away from the device; i.e. from the test chamber 63 through the vents 65 and against the fluid 56 causing it to move through the conduit passage toward the outer chamber 61. The first phase of this movement is quickly and readily discernible by the movement of the liquid through the horizontally disposed passage 59. Since the volume of the passage is very small compared to that of either of the chambers, a small amount of liquid will fill a relatively large lineal portion, and this filling may be quickly and easily ascertained. As the leak continues however the horizontal passage becomes filled and the liquid therein empties from the inner chamber through the conduit into the outer chamber 61, as illustrated in FIG. 8.

Figure 9:
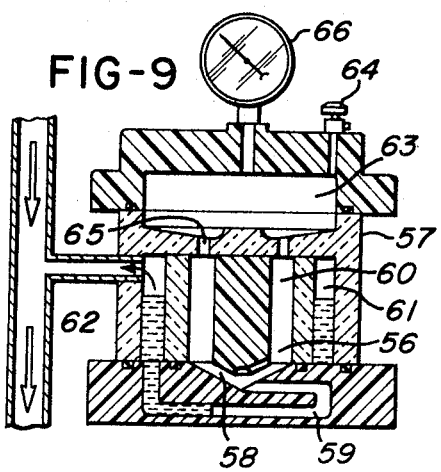
FIG. 9 is a cross-sectioned elevational view of the same leak detector at a later intermediate stage in the test.
Figure 10:
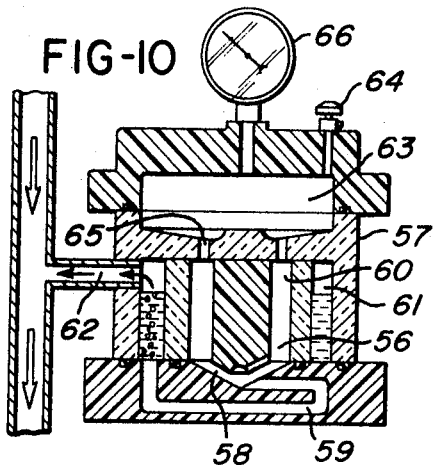
FIG. 10 is a cross-sectioned elevational view of the same leak detector at the final stage of the leak detection.

Referring now to FIG. 9, as the leak continues and further pressure drop is experienced as indicated by the reading on the gauge 66, all of the liquid will move from the inner chamber into the outer chamber; and the last portion of such liquid so moving will again pass through the horizontally disposed conduit. At this point again a very small leak may be detected by a rather rapid movement of the liquid within the conduit 59. Finally, as illustrated in FIG. 10 as the leak continues and the pressure drop continues to increase, all of the liquid will have been moved from the inner chamber and the horizontally disposed conduit into the outer chamber. At this point however it is important to note that although all of the liquid is within the outer chamber, this chamber is not filled to the point at which the liquid will escape through the main fitting 62 and pass into the fluid system to the possible detriment thereof. Even though the liquid thus comes to a stop however and does not change its movement, further leak detection may still be read by the observance of the passage of gaseous bubbles through the liquid in the outer chamber. If the device of the present invention is to be used in the detection of leaks in a vacuum system, i.e. one wherein the pressure within the system is less than atmospheric pressure, just the reverse of the above-described movements of the liquid within the chambers may be effected. In such a case, the liquid in preparation for the test would all be moved into the outer chamber 61 and a leak into the vacuum system would then cause the liquid to move toward the inner chamber, first through the horizontally disposed tube 65, then upwardly in the chamber, and finally by the bubbling of gas through the liquid.

While the bubbling of the gas through the liquid residing totally within one of the inner or outer chambers is normally a satisfactory indication of the continuance of a leak, the magnitude of which has usually by that time been determined to a satisfactory degree, there may be certain instances wherein it is desired to continue to monitor the degree of the leak as a measure of the fluid movement into the chamber. In such cases, this type of reading can be continued by first opening the vent valve 64 slightly to allow the liquid within the unit to reverse its direction; i.e., toward the condition of the unit prior to the test. Once the vent valve is then closed, the test may be continued as at the beginning. A consideration of FIGS. 6 through 10 will demonstrate that the device of the present invention monitors and envinces a leak in four distinct phases; viz., (1) movement of the fluid from one chamber to the other through the horizontal tube at a relatively high lineal rate as shown in FIG. 7; (2) the rising of the fluid as it fills the chamber opposite that in which it resided at the commencement of the test at a relatively slower lineal rate as shown in FIG. 8; (3) the movement of the last of the fluid, again through the horizontal tube at a relatively high lineal rate as illustrated in FIG. 9; and (4) the bubbling of the gas through the liquid once it has all entered into that chamber opposite that in which it resided at the commencement of the test as illustrated in FIG. 10.

Referring again to FIGS. 1 through 5, in the preferred embodiment illustrated, readability is enhanced by the provision on or within the outer wall of the outer chamber 50 of vertically disposed markings which may be numbered to indicate the precise level of the fluid within either of the inner or outer chambers. Similarly, although it is not shown, the horizontal tube may be provided with lineally spaced markings to establish the precise location of the liquid as it moves there through. So also may such markings be vertically arranged on the center post 34. Where the relative volumes of the inner and outer chambers and tube and conduit passages are known and proper calculations are made, the movement of the liquid either within the tube or within either of the inner or outer concentric chambers over a known interval of time may be translated into a leakage rate. It will be observed that in the preferred case, the markings on the outer wall of the outer chamber 51 are positioned along that surface thereof which corresponds to the face of the gage 46 so that both of these features of the device may be seen at the same time. Further to enhance readability of the device, the groove 38 on the bottoms of the post 34 within the inner chamber 50 may be such that its upper opening is also aimed in the direction of the markings on the outer wall and the face of the gage so that the formation of bubbles to pass through the liquid, either within the inner or outer chamber will be directed to that portion thereof which is in view when the device is being viewed from the front whereon the markings also occur.

While the within invention has been described in considerable detail in connection with the illustrated embodiments it is to be understood that the particularization and detail have been for the purpose of illustration only and do not limit the scope of the invention as it is defined in the subjoined claims.

1. A fluid system leak detector comprising first and second liquid chambers joined by an interconnecting conduit, the first chamber being communicable with the fluid system to be checked and the second chamber being in vented communication with an overlying and otherwise selectively closeable test pressure chamber, and a liquid confined within said chambers moveable from one to the other through said conduit in response to a pressure differential between the fluid system and the test pressure chamber.

2. A leak detector according to claim 1 wherein the walls of said chambers and at least a portion of said conduit are transparent.

3. A leak detector according to claim 1 wherein the cross sectional area of at least a portion of said conduit is substantially less than the cross sectional area of either of said chambers.

4. A fluid system leak detector comprising concentric inner and outer annular liquid chambers joined by an inter-connecting conduit, the outer chamber being communicable with the fluid system to be checked and the inner chamber being in vented communication with an overlying test pressure chamber, a transparent tube horizontally disposed within said outer chamber and in fluid transmitting communication with the opening of said inter-connecting conduit into said outer chamber, and a liquid confined within said annular chambers moveable from one chamber to the other through said conduit in response to a pressure differential between the fluid system and the test pressure chamber, wherein the quantity of the liquid is such that, when it is all in either of said annular chambers it will not fill the same, either to the point of communication with the fluid system when it is all in the outer chamber or to the vent to the test pressure chamber when it is all in the inner member.

5. A leak detector according to claim 4 wherein the walls of at least said outer chambers are transparent.

6. A leak detector according to claim 4 wherein said liquid is opaque.

* * * * *